United States Patent [19]

Sakamoto et al.

[11] 4,251,625
[45] Feb. 17, 1981

[54] METHOD OF PRODUCING A HALFTONE PICTURE BY VIBRATING LIGHT SOURCE

[75] Inventors: Seiya Sakamoto, Kyoto; Tetsuo Hohki, Ibaragi, both of Japan

[73] Assignee: Dainippon Screen Seizo Kabushiki Kaisha, Kyoto, Japan

[21] Appl. No.: 955,270

[22] Filed: Oct. 26, 1978

[30] Foreign Application Priority Data

Nov. 1, 1977 [JP] Japan ................... 52-131367

[51] Int. Cl.$^3$ ........................ G03F 5/00; G03C 5/04
[52] U.S. Cl. ........................ 430/396; 354/4;
355/54; 358/283; 430/6; 430/494
[58] Field of Search ............... 96/27 R, 27 E, 27 H,
96/45, 45.2, 116, 36.1; 355/48, 50, 54; 430/30,
6, 396, 494; 358/283; 354/4

[56] References Cited

U.S. PATENT DOCUMENTS

| | | | |
|---|---|---|---|
| 3,075,042 | 1/1963 | Levine | 430/396 X |
| 3,461,229 | 8/1969 | Oppenheimer | 430/396 X |
| 3,667,947 | 6/1972 | McKee | 96/36.1 |
| 3,668,311 | 6/1972 | Bigliano et al. | 430/396 X |
| 3,737,225 | 6/1973 | Aughton | 355/48 |
| 3,867,150 | 2/1975 | Ketley | 96/36.3 |
| 3,888,673 | 6/1975 | Suzuki et al. | 96/36.1 |
| 3,985,439 | 10/1976 | Kiemle | 430/396 X |
| 4,004,079 | 1/1977 | Boston | 358/283 X |
| 4,053,906 | 10/1977 | Schultz | 96/36.1 X |
| 4,149,194 | 4/1979 | Holladay | 358/283 |

FOREIGN PATENT DOCUMENTS

53-49501 5/1978 Japan.

*Primary Examiner*—Edward C. Kimlin
*Attorney, Agent, or Firm*—Lackenbach, Lilling & Siegel

[57] ABSTRACT

A spot of light is formed upon a photosensitive material which is moved in a scanning direction, and the spot is vibrated to and fro along a vibration direction at a considerable angle to the scanning direction, and the amplitude of vibration, and the center of the vibration path, are controlled so that the spot exposes areas on the photosensitive material which form half-tone dots.

10 Claims, 10 Drawing Figures

METHOD OF PRODUCING A HALFTONE PICTURE BY VIBRATING LIGHT SOURCE

This invention relates to a method for producing a halftone picture by scanning, in which halftone dots produced are aligned on inclined lines at a certain screen angle to the scanning direction.

Many methods and means for reproducing a halftone picture by a picture scanning machine, such as a scanner for plate-making, have heretofore been developed.

For example, a method for reproducing a halftone picture has been invented by the same inventors as the present invention, and has been described in Japanese Patent Laying-open Publication No. 53-49501. The present invention is an improvement of this prior invention.

Figures 1, 3:
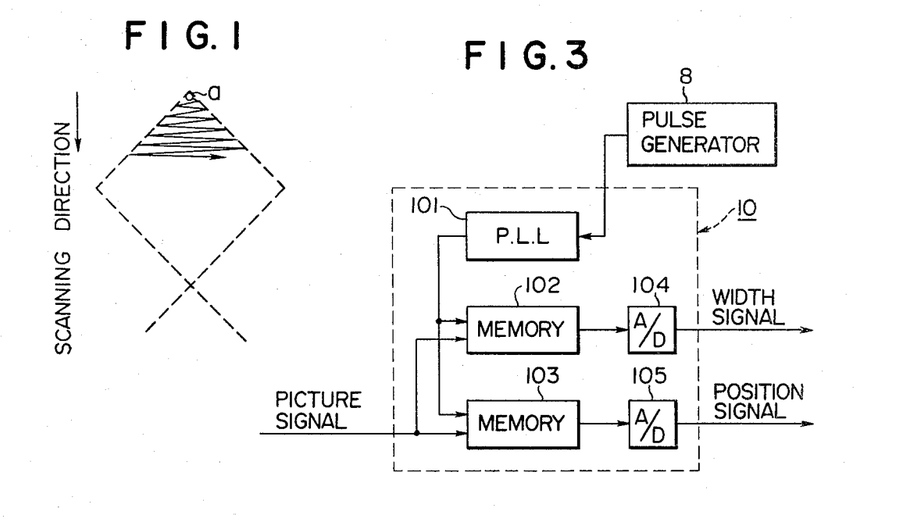
FIG. 1 is a schematic view of the production of a halftone dot according to the aforementioned prior art method.
FIG. 3 is a block diagram of an embodiment of a halftone dot signal generator shown in FIG. 2.

In this prior invention, as shown in FIG. 1, a light ray generated from a light source such as a laser tube, which produces a light spot "a" which scans a photosensitive material attached to a rotating recording cylinder, is oscillated in the direction of the cylinder's axis by an acoustic-optical inclinator element of well-known construction, so as to construct halftone dots, as shown by dotted lines. Further, in order to remove the defect of over-exposure of the photosensitive material during production of the front and the end portions of the dot, and under-exposure of the photosensitive material during production of the middle portion of the dot, which may occur because the laser ray moves slowly at the front and end portions because of its short stroke and quickly in the middle portion because of its long stroke, the brightness of the light spot is reduced during production of the front and the end portions of the dot, and is increased during production of the middle portion, by an optical modulator element of a well-known type, which may be either an acoustic-optical or an electric-optical modulator element.

This method is useful, but it has a defect. A halftone picture in which the halftone dots are aligned on inclined lines having a certain non-zero screen angle relative to the scanning direction cannot be produced. The half-tone dots produced by this prior art are aligned on lines having no screen angle.

As is well-known in the art, when several different halftone pictures are to be used for color separations, it is necessary that the pictures should have different screen angles, in order to avoid undesirable moire patterns. Therefore the abovementioned defect of the prior art is quite serious.

Therefore it is an object of the present invention to provide a method for reproducing a halftone picture in which the halftone dots produced are aligned on inclined lines having a certain screen angle relative to the scanning direction, which has a simple operation, and which is reliable.

According to the present invention, this object is accomplished by the provision of a method for producing a halftone picture on a photosensitive material, comprising the steps of forming a spot of light on the surface of the material, causing motion of the material relative to the spot in a scanning direction, vibrating the spot to and fro along a vibration direction which is at a substantial angle to the scanning direction through a certain vibration width about a central point, the vibration center, and controlling the amplitude of the vibration width and the position of the vibration center so that the spot exposes areas on the photosensitive material which form half-tone dots, as the material moves relative to the spot in the scanning direction.

In order that the present invention may be better understood, preferred embodiments will now be described with reference to the accompanying drawings, which are given for the purposes of illustration only, and thus are not intended to be limitative of the present invention, and wherein.

Figure 2:
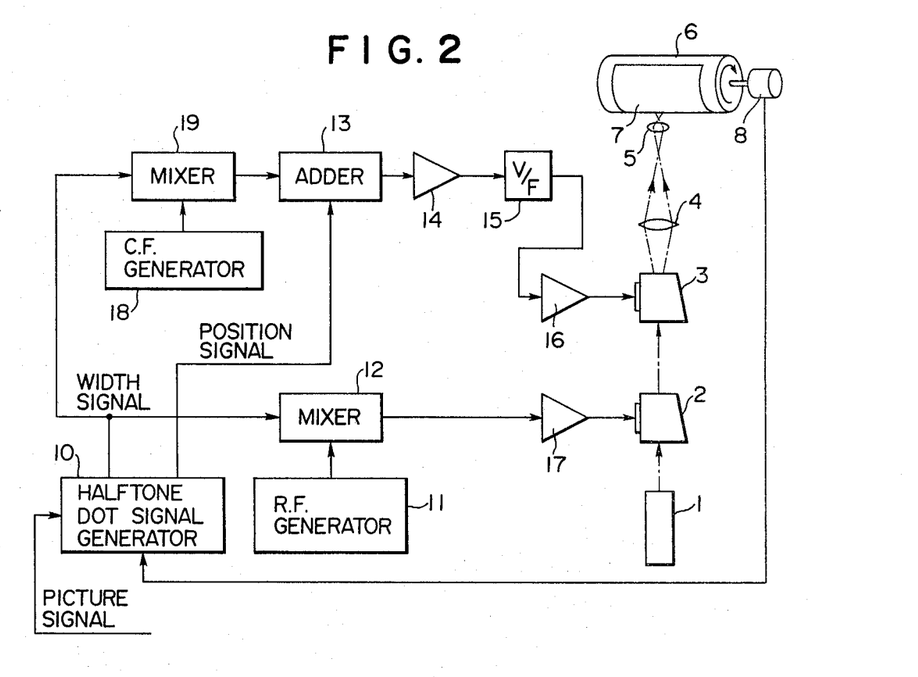
FIG. 2 is a schematic view of an embodiment of a machine used for a method according to the present invention.

In FIG. 2 there is shown one embodiment of a machine for performing a method according to the present invention.

A laser light ray generated from a light source 1 such as a laser tube is projected onto a photosensitive material 7 attached to a recording cylinder 6 via an optical modulator element 2, an optical inclinator element 3, a condenser lens 4, and a focusing lens 5. While the brightness of the light ray is controlled by the optical modulator element 2, the light ray, before it impinges upon the photosensitive material 2, is inclined by the optical inclinator element 3, by an amount depending upon the frequency of the signal input to the optical inclinator element 3. This inclination is, in this embodiment, arranged to be in a vibration direction perpendicular to the scanning direction, which is the circumferential direction of the rotating cylinder 6. During operation the frequency of the signal input to the optical inclinator element 3 changes up and down very rapidly compared to the scanning speed, so that the spot of light formed by the light ray upon the photosensitive material 7 is moved to and fro very quickly compared to the scanning speed. Thus it is seen that the optical inclinator element 3 is frequency-controlled, while, by contrast, the optical modulator element 2 is controlled by the amplitude of the signal fed into it.

By suitably controlling the position of the center of the vibration path of the light spot, and the width of the vibration, it is possible, for instance, to cause the light spot to move so as to expose areas of the photosensitive material 7 which form halftone dot areas as required, according to the picture signals obtained by scanning an original picture and performing color separations on it. The method of controlling the light spot will now be described.

A pulse generator 8 is arranged coaxially to the recording cylinder 6 and generates pulse signals which serve for synchronization of the scanning with the rotation of the cylinder, and which are sent to a halftone dot signal generator 10. In this embodiment, picture signals picked up by scanning an original picture (not shown) are also sent to the halftone dot signal generator 10. However, it is quite within the scope of the present invention that the picture signals may be obtained from another kind of source, for instance from a computer memory. In any event, the halftone dot signal generator 10 receives input picture signals and synchronization signals and produces output width signals which represent the width required for the vibration path of the light spot, and position signals, which represent the position required for the center of the vibration path of the light spot.

The halftone dot signal generator, as shown in FIG. 3, comprises a first memory 102 for the width signals, a second memory 103 for the position signals, a phased lock loop circuit 101 which converts the frequency of the pulse signals coming from the pulse generator 8 and generates reading clock pulses for reading the position signals and the width signals stored in the first and the second memories 102 and 103 corresponding to the sampling pitches of the picture signals.

Figure 4:
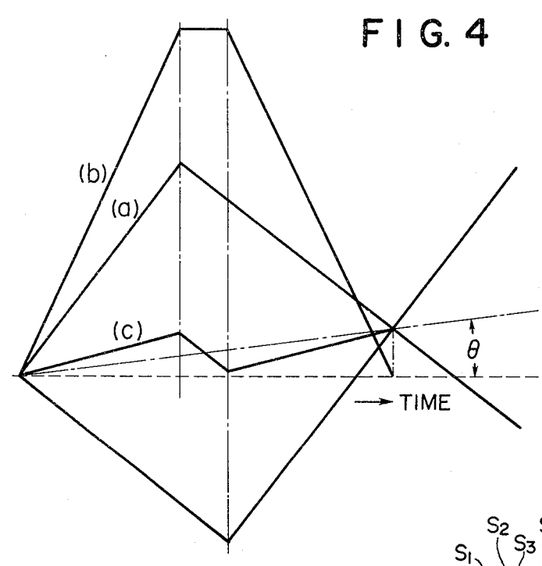
FIG. 4 is a schematic view of specimen signals stored in a memory shown in FIG. 3.
Figure 6:
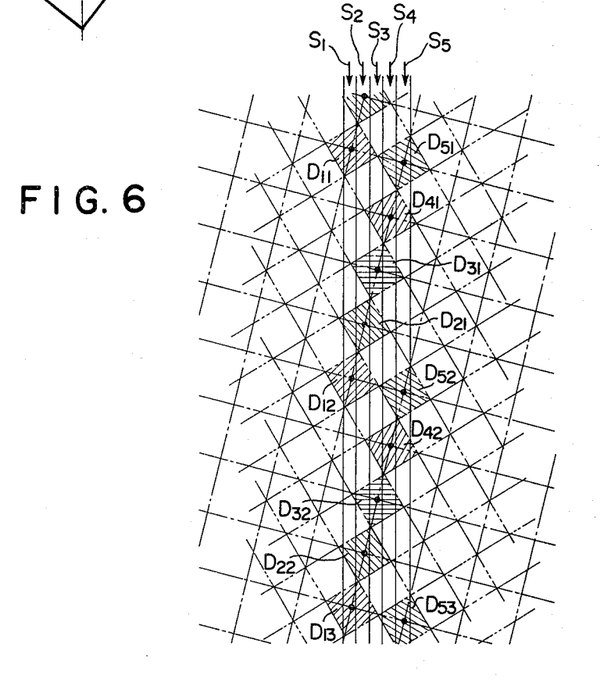
FIG. 6 is a schematic view of an example of production of halftone dots according to the present invention.

In the first and the second memories 102 and 103 there are stored a series of digital values of the width signals and the position signals for the halftone dots, a different set of which is provided for each halftone dot area rate to correspond to a certain level of picture signal. Further, a different set of values for the width signals and position signals for each dot area rate is provided for each desired screen angle. By the nature of the process of the present invention, halftone dot pictures can only be produced which have a screen angle, relative to the scanning direction, which is the arc cotangent of an integer. In FIG. 6, for example, where the scanning direction is up and down, the screen angle is the arc cotangent of 4. This means that on each scan line the dots whose centers are within that scan line occur in an exactly repeating pattern. In accordance with this, for each halftone dot area rate required, and for each desired screen angle, width and position signals such as shown, for example, in FIG. 4 are stored in the memory. The phased lock loop circuit 101 produces an output frequency which is a multiple of the input frequency supplied by the pulse generator 8 and which reads values of the width and position signals from the memories 102 and 103 in succession until the pattern required for these signals repeats according to the repeating required on the scan line, as above explained. Then the reading addresses from the memories are set back again to the beginning, and the process is repeated.

The width and position signals required to produce halftone dots corresponding to different halftone dot area rates must of course all be stored in the memories together, since the color values of the picture may vary from moment to moment across it. However, the width and position signals required for different screen angles need not all be stored in the memory together, but when the machine of FIG. 2 is being reset for a different screen angle the memory may be reloaded in some appropriate fashion with the new halftone dot signals required for the new screen angle. Or, alternatively, the signals required for a variety of screen angles may all be held in the memory together and a suitable means may be provided to access one row or another of them, depending upon the actual screen angle required. In any event, this is a matter of conventional technology, well known to those skilled in the art, and is not germane to the concept of the present invention.

In FIG. 4 is shown an example of a width signal and a position signal stored in the two memories 102 and 103. In this figure (a) represents the outline of the halftone dot that is to be generated; (b) represents the width signal that is to determine the width of the vibration of the light spot; and (c) represents the position signal that is to determine the position of the center of the vibration of the light spot. The halftone dot generated has a screen angle $\theta$ with respect to the scanning direction, which in this figure is left to right.

Figure 5:
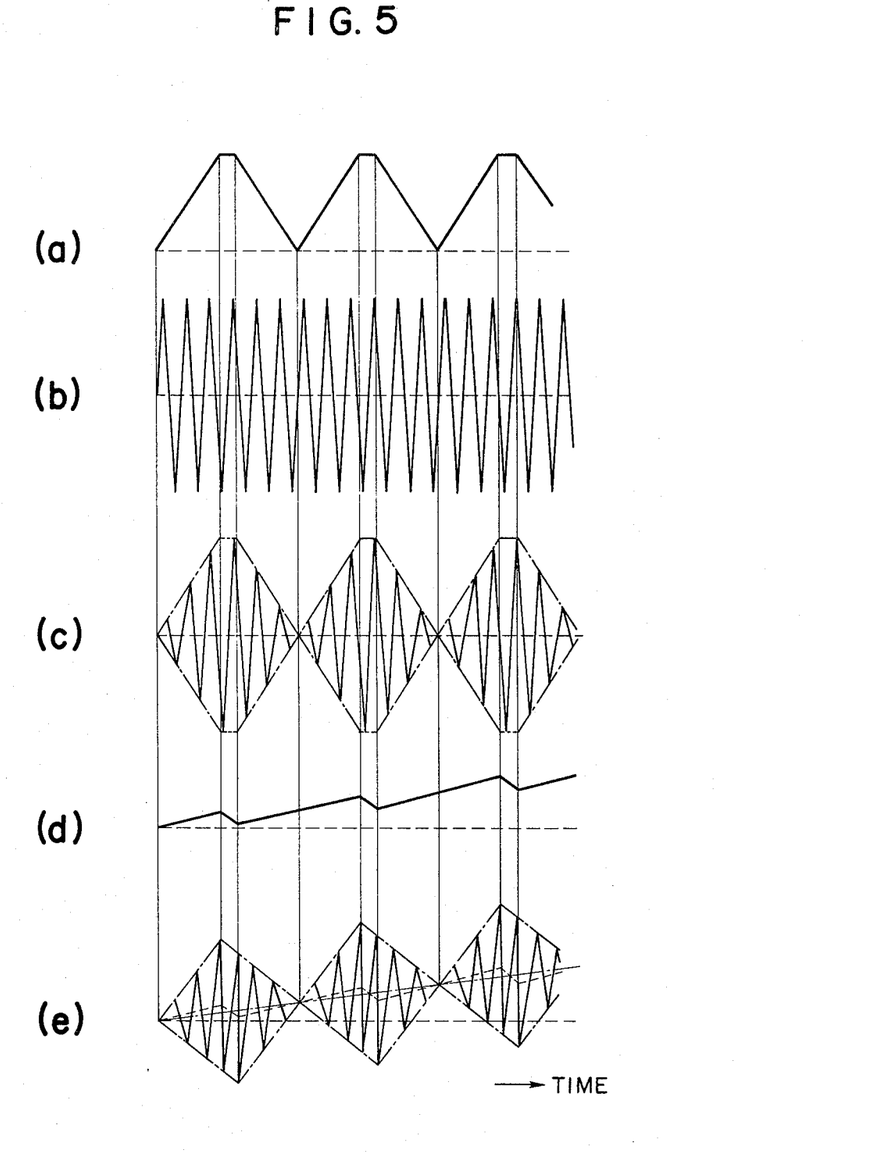
FIG. 5 is a schematic view of an example of signals for controlling an optical modulator element and an optical inclinator element.

In FIGS. 5, (a) and (d), represent examples width and position signals corresponding to a halftone dot area of 50%, as stored in the memories. If the picture signal input to the halftone dot generator 10 requires halftone dots with 50% dot area, then the generator 10 generates these signals, as in FIG. 5. Referring to FIG. 2, the width signal, such as shown in FIG. 5(a), is sent to a mixer 19 which also receives a carrier signal as shown in FIG. 5(b) produced by a carrier frequency generator 18. The mixer 19 amplitude-modulates the carrier signal according to the width information, and outputs an amplitude-modulated signal, shown in FIG. 5(c).

The frequency of the carrier signal determines the number of vibrations to and fro on the photosensitive material 7 performed by the light spot, as caused by the optical inclinator element 3. This frequency is usually set to a tenth of the frequency (several MHz) of a radio frequency signal generated from a radio frequency signal generator 11.

This radio frequency signal from the radio frequency signal generator 11 is sent to a mixer 12 and is amplitude-modulated there by the width signal fed from the halftone dot signal generator 10 in the same manner as in the mixer 19. The modulated signal is sent to a power amplifier 17 and then to the optical modulation element 2 so as to control the brightness of the light ray fed from the light source 1, in the same way as in the above-mentioned prior art.

The carrier signal as modulated in the mixer 19 is then sent to an adder 13 and to it there is added the position signal shown in FIG. 5(d) sent from the halftone dot signal generator 10, to obtain a halftone dot form signal as shown in FIG. 5(e) which is adapted to produce halftone dots at a certain screen angle to the scanning direction.

This thus-obtained halftone dot form signal is then sent to a voltage-frequency converter 15 via a voltage amplifier 14 and is converted there into a frequency-modulated signal which is fed to the optical inclinator element 3 via a power amplifier 16 and which inclines the light beam fed from the optical modulator element 2 to and fro so as to cause it to form halftone dots having a certain screen angle with respect to the scanning direction on the photosensitive material 7. The outline of the general form of these dots is shown in FIG. 5(e) by a one-dotted line.

The above describes the basic method of forming halftone dots according to the present invention. FIG. 6, in which the halftone dot area is 50%, further illustrates the process.

During each scanning line the halftone dots whose centers are included in that scanning line are produced. Thus by the first scanning $S_1$ the halftone dots $D_{11}$, $D_{12}$, and $D_{13}$ are produced. Then the second scanning $S_2$ produces the halftone dots $D_{21}$ and $D_{22}$, the third scanning $S_3$ produces the halftone dots $D_{31}$ and $D_{32}$, the fourth scanning $S_4$ produces the dots $D_{41}$ and $D_{42}$, the fifth scanning $S_5$ produces the dots $D_{51}$, $D_{52}$, and $D_{53}$, and so on.

In this case it is necessary to determine in advance whether the halftone dots in question to be recorded are included in the scanning line being performed.

Since the centers of the halftone dots are determined once the number of lines per unit length of the screen, and the screen angle, are determined, these locations of the centers of the halftone dots can be stored in the memories in advance. Thus they can be read in sequence and a discrimination can be made as to whether the halftone dots lie in the scanning line being recorded or not. However, in this case the memories may have to have a very large capacity. Another way is to calculate the centers of the halftone dots to be recorded for each scanning line and to control the optical modulator element by the calculation results. This is more practicable. The details will be obvious to one skilled in the art.

Figure 7:
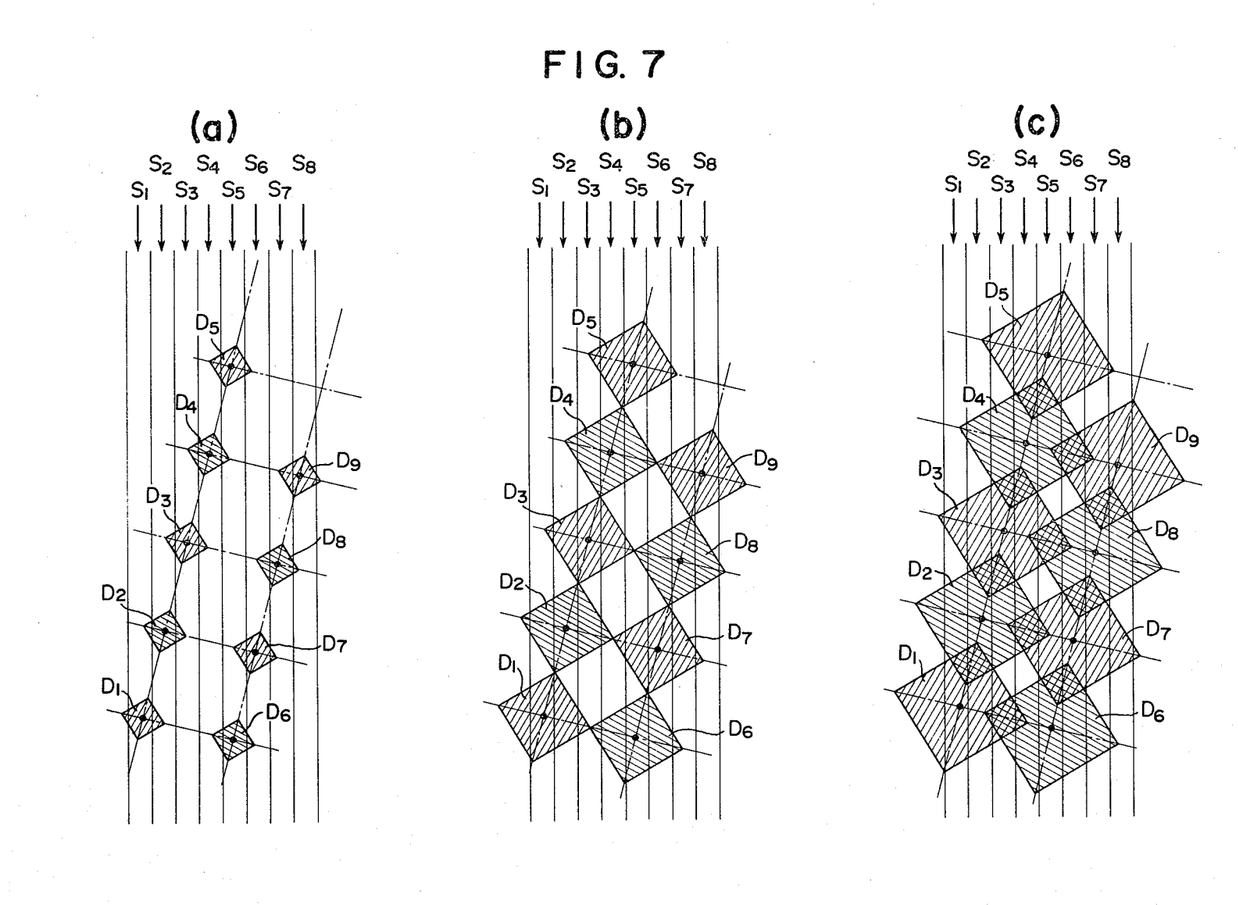
FIG. 7 is a schematic view of examples of production of halftone dots having 12.5%, 50%, and 87.5% halftone dot area rates, according to the present invention.

In FIG. 7, as another example, are shown the patterns of halftone dots having halftone dot area rates of 12.5%, 50% and 87.5%. In each case the dots in each successive scan line are recorded according to whether or not their centers lie in that scan line. It will be seen that when the halftone dot area rate is greater than 50% the dots overlap. In general according to the present invention when a dot whose center lies in a scan line is being drawn the position of the light spot may move out far beyond that scan line and encroach on the neighboring scan lines.

Figure 8:
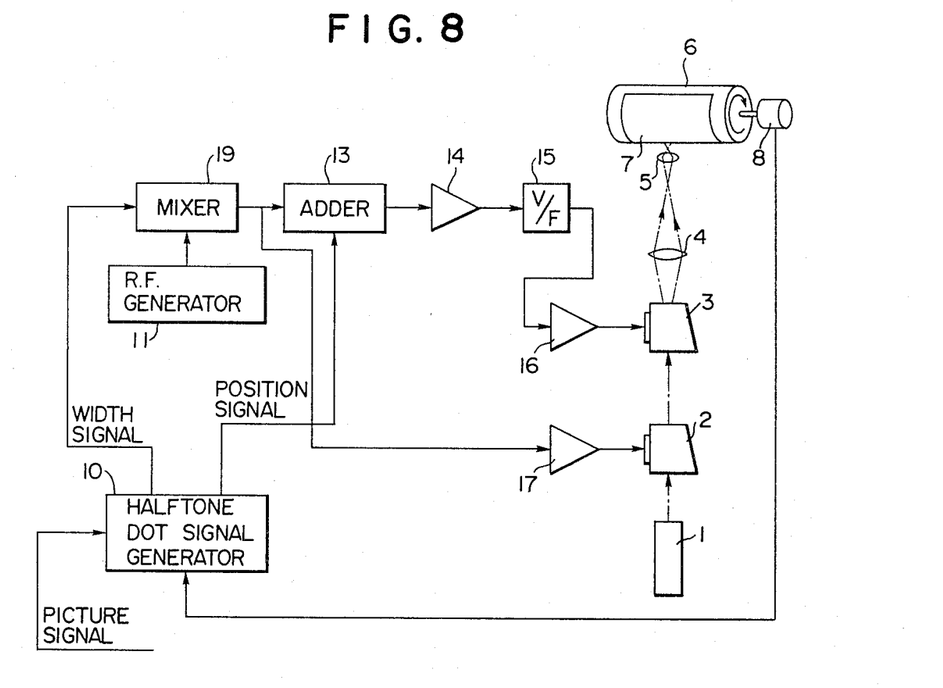
FIG. 8 is a schematic view of another embodiment of a machine used to carry out the method of the present invention.

In FIG. 8 there is shown another embodiment of a machine for performing a method according to the present invention, in which elements which correspond to numbered elements in FIG. 2 are designated by the same reference numerals.

In this case the radio frequency signal generator 11 acts also as the carrier frequency generator 18 in FIG. 2, and it is a simpler construction, when the optical inclinator element 2 is adapted to respond quickly enough to the signal input to it, which has a frequency of several tens of MHz.

Figure 9:
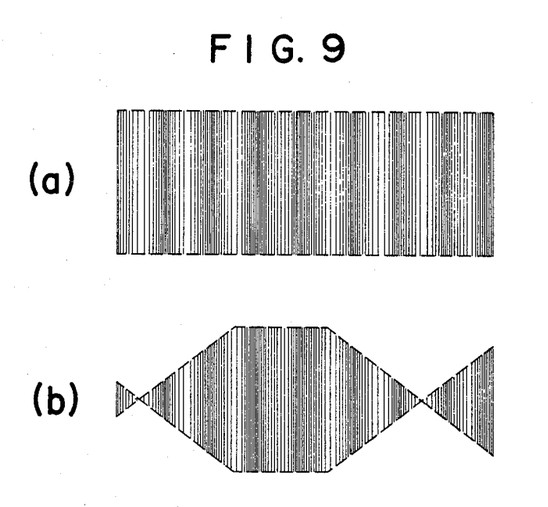
FIGS. 9 and 10 are schematic views of another example of signals for explanation of another method according to the present invention.

It will be appreciated that if the optical inclinator element 3 is also provided with the function of an optical modulator element the separate optical modulator element can be omitted. Such has been done in another embodiment. In this case the frequency-modulated signals shown in FIG. 9(a), which are output from the voltage-frequency converter 15 in FIG. 2, are again amplitude-modulated by the width signals from the halftone dot signal generator 10 to obtain the amplitude-and-frequency-modulated signals shown in FIG. 9(b), which are sent to the optical inclinator/modulator element 3 for controlling the light ray fed thereto. In this embodiment an additional advantage is obtained since only one optical inclinator/modulator element is used and there is no need to adjust the setting of the optical modulator element with respect to the optical inclinator element. This is more convenient.

Figure 10:
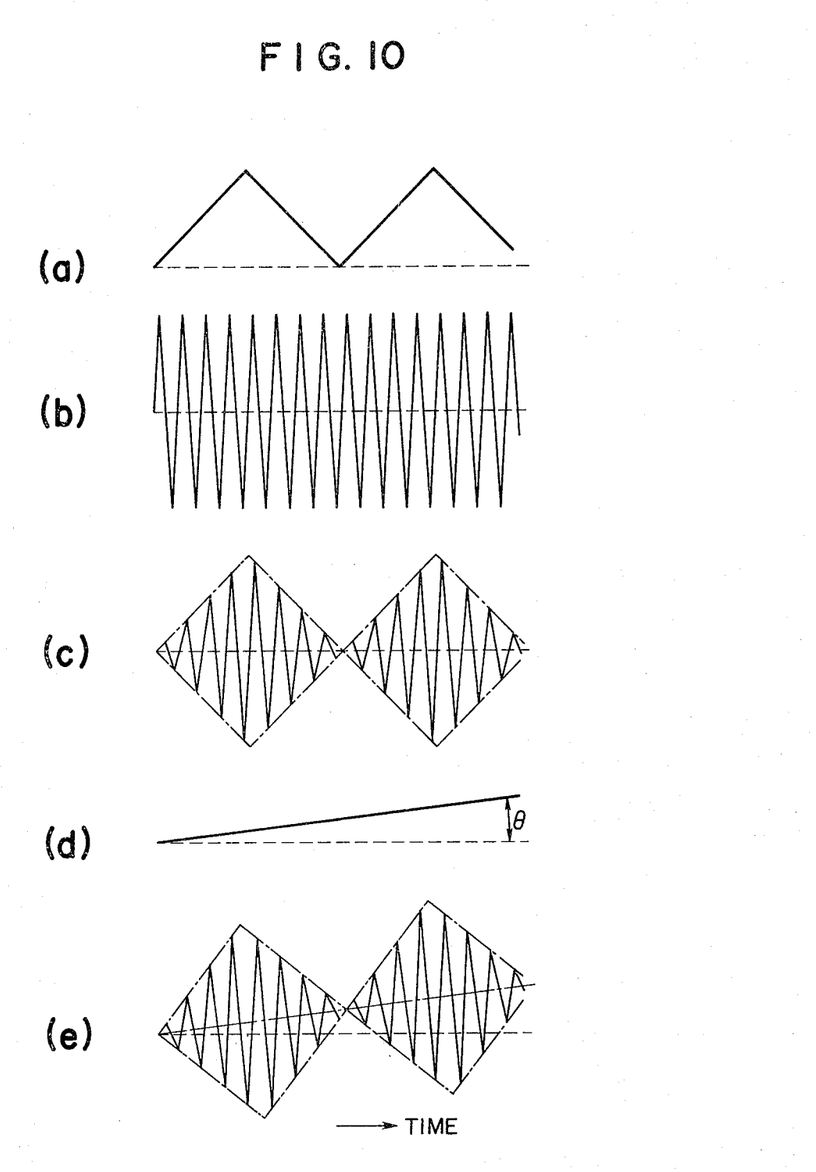

In the embodiments described above the vibration direction of the light spot, that is to say, the direction in which it is moved by the optical inclinator element, is perpendicular to the scanning direction. However, this is not a necessary limitation. In various embodiments this angle could be different, by making the setting angle of the optical modulator different, and it would merely be necessary to store different contents in the memories. Another particular embodiment can be obtained when the angle between the scanning direction and the vibration direction, added to the screen angle with respect to the scanning direction of the halftone dots produced, is 90°; that is to say, when the vibration lines are diagonally across the halftone dots generated, as shown in FIG. 10(e), wherein the scanning direction is from left to right.

In this case the required screen angle is obtained by inclining the optical inclinator element with respect to the axis of the recording cylinder by the screen angle. The width signals and the position signals stored in the halftone dot signal generator's memories have simpler forms, as shown in FIGS. 10(a) and (d), in which the halftone dot area is 50%. With respect to the embodiment shown in FIG. 2, when the picture signal is input to the halftone dot signal generator 10 the width signal shown in FIG. 10(a) and the position signal shown in FIG. 10(d) are output. The width signal is sent to the mixer 19. The carrier signal shown in FIG. 10(b) generated by the carrier signal frequency generator 18 is fed to the mixer 19 and is amplitude modulated there, obtaining the amplitude modulated signal shown in FIG. 10(c). The carrier signal modulated in the mixer 19 is then sent to the adder 13 and is added there to the position signal shown in FIG. 10(d) to obtain the halftone dot form signal shown in FIG. 10(e) having the desired screen angle. Thus halftone dots of the required form are recorded, as described above.

Although the present invention has been shown and described with reference to preferred embodiments thereof, it will be readily understood that various changes and modifications can be made to the detail thereof by a person skilled in the art without departing from the scope of the invention. For example, it would be possible to memorize in the memories only a width signal and a position signal corresponding to the halftone dot area rate of 100%, and to calculate the width and position signals corresponding to other halftone dot area rates from them on a continuous basis. Other alterations can be easily thought of. Therefore it is desired that the scope of protection granted should not be limited by the details of any of the embodiments described, or of the illustrations, both of which were given for purposes of explanation only, but only by the appended claims.

What is claimed is:

1. A method for producing a half-tone picture on a photosensitive material, wherein the halftone dots are produced along a line of an arbitrary screen angle with respect to a scanning direction, comprising the steps of:
    forming a spot of light on the surface of the material;
    causing a motion of the material relative to the spot in a scanning direction;
    vibrating the spot to and fro along a vibration direction which is at a substantial angle to the scanning direction through a certain vibration width about a central point, the vibration center; and
    controlling the amplitude of the vibration width and the position of the vibration center by guiding the center of the vibration along a line substantially equal to the screen angle with respect to the scanning direction so that the spot exposes areas on the photosensitive material which form half-tone dots, as the material moves relative to the spot in the scanning direction.

2. A method as in claim 1, wherein the screen angle of the half-tone dots produced with respect to the scanning direction is non-zero.

3. A method as in claim 1, wherein the angle between the scanning direction and the vibration direction is 90°.

4. A method as in claim 2, wherein the angle between the scanning direction and the vibration direction is 90°.

5. A method as in claim 2, wherein the angle between the scanning direction and the vibration direction, added to the screen angle with respect to the scanning direction of the half-tone dots which are produced, is 90°.

6. A method as in any of claims 1-5, wherein the spot is vibrated by an optical inclinator element which is controlled by a frequency-modulated signal.

7. A method as in any of claims 1-5, wherein the brightness of the spot is controlled to be according to the vibration width by an optical modulator element which is controlled by an amplitude modulated signal.

8. A method as in claim 6, wherein the brightness of the spot is controlled to be according to the vibration width by an optical modulator element which is controlled by an amplitude modulated signal.

9. A method as in any of claims 1-5, wherein the spot is controlled by an optical inclinator/modulator element which is controlled by a signal, the frequency of the signal controlling the optical inclinator/modulator element to vibrate the spot, and the amplitude of the signal controlling the optical inclinator/modulator element to control the brightness of the spot according to the vibration width.

10. The method as in any of claims 1-5, wherein the material also moves, in a direction perpendicular to the scanning direction, relative to the spot, at a speed which is low relative to the motion along the scanning direction.

* * * * *